United States Patent [19]
Workman

[11] Patent Number: 6,002,083
[45] Date of Patent: Dec. 14, 1999

[54] TERMINAL BOX FOR ELECTRIC MOTOR

[75] Inventor: Jerry L. Workman, Florissant, Mo.

[73] Assignee: Emerson Electric Co., St. Louis, Mich.

[21] Appl. No.: 08/970,373

[22] Filed: Nov. 14, 1997

[51] Int. Cl.[6] .................................................. H05K 5/02
[52] U.S. Cl. ...................................... 174/17 CT; 174/50
[58] Field of Search .................................. 174/17 CT, 50, 174/66; 220/3.8, 241

[56] References Cited

U.S. PATENT DOCUMENTS

| | | | |
|---|---|---|---|
| 598,498 | 2/1898 | Close ......................................... | 220/3.8 |
| 2,541,236 | 2/1951 | Guiffrida ................................... | 174/50 |
| 3,592,956 | 7/1971 | Fork . | |
| 3,910,448 | 10/1975 | Evans et al. ............................. | 220/3.8 |
| 4,165,443 | 8/1979 | Figart et al. . | |
| 4,733,015 | 3/1988 | Barnes .................................. | 174/65 R |
| 4,733,019 | 3/1988 | Pichler et al. . | |
| 4,808,772 | 2/1989 | Pichler et al. . | |
| 4,839,472 | 6/1989 | Pichler . | |
| 4,865,893 | 9/1989 | Kunze et al. . | |
| 5,274,194 | 12/1993 | Belcher . | |
| 5,347,084 | 9/1994 | Roney et al. . | |
| 5,378,854 | 1/1995 | Hoover . | |
| 5,594,207 | 1/1997 | Fabian et al. . | |
| 5,665,939 | 9/1997 | Jorgensen et al. ................... | 174/50.52 |

FOREIGN PATENT DOCUMENTS 2397733  3/1979  France .
2030073  1/1972  Germany .
2215602  10/1973  Germany .

Primary Examiner—Dean A. Reichard
Attorney, Agent, or Firm—Howell & Haferkamp, LC

[57] ABSTRACT

A motor terminal box of the present invention comprises a base having a first perimeter flange and a cover having a second perimeter flange adapted for engagement with the first perimeter flange. One of the first and second perimeter flanges has a projection and the other of the first and second perimeter flanges has a recess adapted to receive the projection when the first and second perimeter flanges are in engagement with one another. In another aspect of a terminal box of the present invention, the first perimeter flange has a first mating surface lying substantially in a first plane. The second perimeter flange has a second mating surface lying substantially in a second plane. The first and second planes are substantially co-planer when the first and second perimeter flanges are in engagement with one another. One of the first and second perimeter flanges includes a projection and the other of the first and second perimeter flanges includes a recess adapted to receive the projection when the first and second perimeter flanges are in engagement with one another. At least a portion of the projection is spaced from the first and second planes when the first and second perimeter flanges are in engagement with one another.

23 Claims, 2 Drawing Sheets

U.S. Patent  Dec. 14, 1999  Sheet 1 of 2  6,002,083
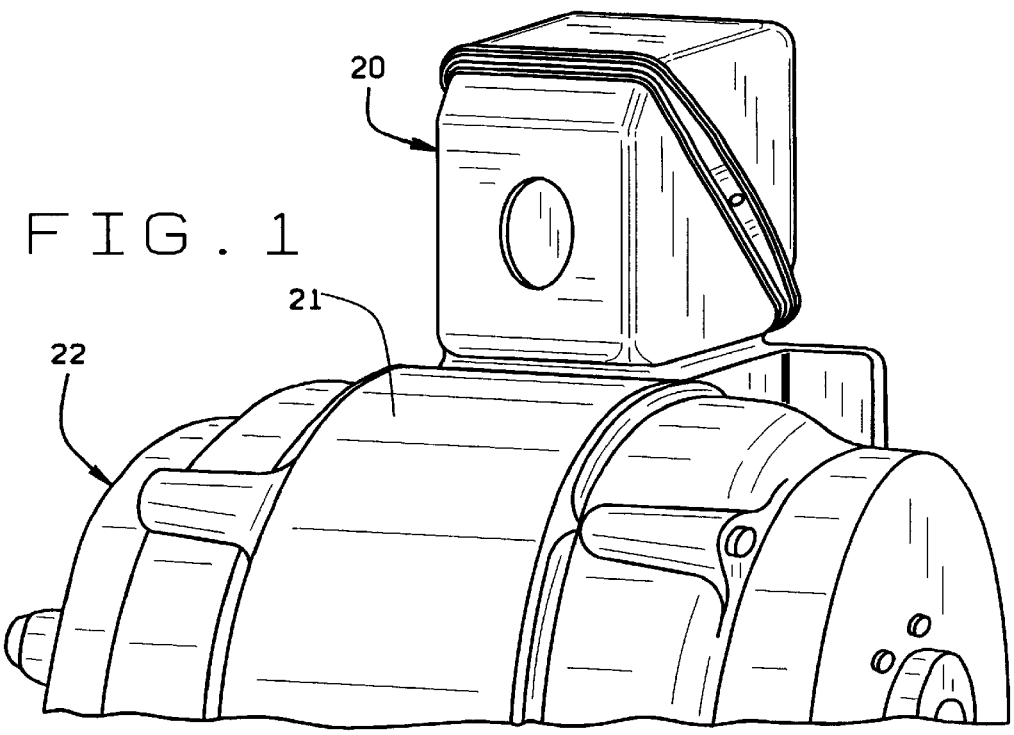
FIG. 1
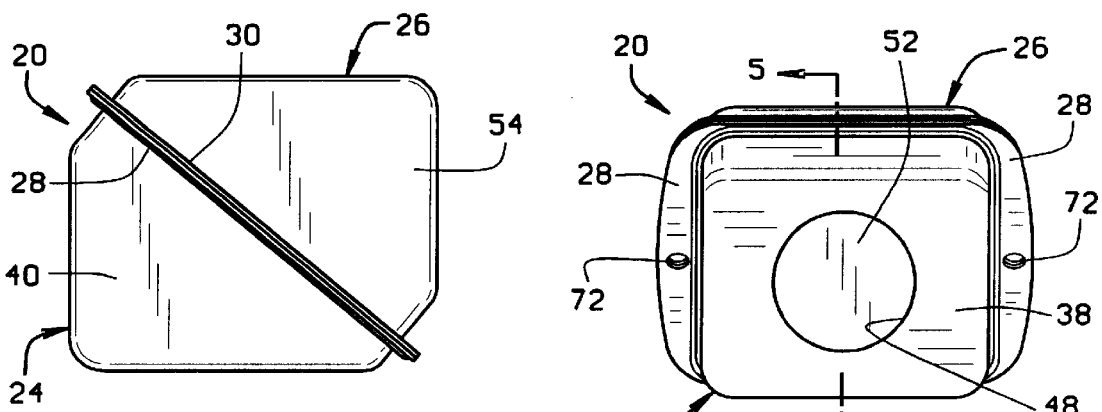
FIG. 2
FIG. 3
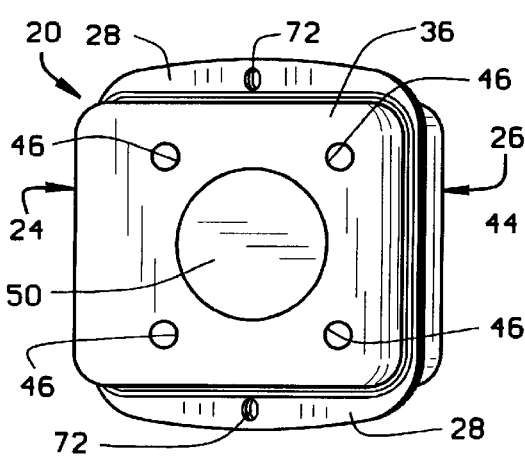
FIG. 4
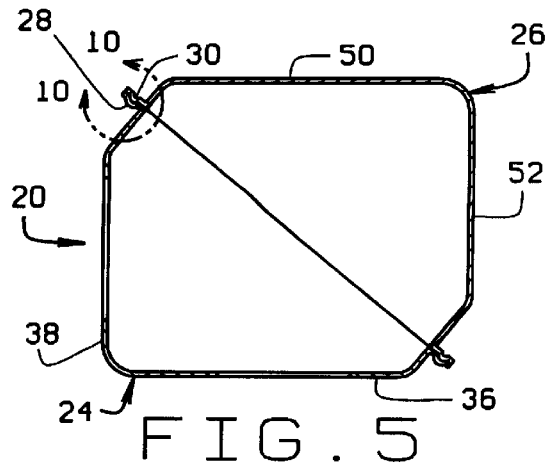
FIG. 5

6,002,083

TERMINAL BOX FOR ELECTRIC MOTOR

BACKGROUND OF THE INVENTION

This invention relates generally to terminal boxes for electric motors and, more particularly, to terminal boxes which are mounted directly on an exterior surface of a motor housing.

Electric motors often have terminal boxes which house the connections between lead wires from the motor and feed wires from a source of electricity. The terminal boxes are generally mounted directly to an exterior surface of a motor housing. Typically, the terminal box comprises a base and a removable cover which gives an electrician easy access to the interior of the terminal box. In many such terminal boxes, the base includes a flat perimeter flange which extends around and projects outwardly from the top edges of the sidewalls of the base, and the cover has a corresponding flat perimeter flange which mates with the flange of the base when the terminal box is closed. Typically, the flanges are connected to one another with mechanical fasteners. In some prior art terminal boxes, a gasket is disposed between the flanges to help prevent water, oil or coolant from getting into the interior of the terminal box.

A problem with many of these prior art terminal boxes is that the flat mating surfaces of the flanges fail to provide a leak-proof seal, especially where the metal used for the terminal box is of a relatively thin gauge. Even where gaskets are used between the flat flanges, liquids are permitted to "wick" in because the seal may not be sufficiently tight. Where a thin gauge metal is used for the terminal box, the problem cannot be solved by simply tightening the mechanical fasteners which hold the flanges to one another, because over-tightening may tend to deform the thin gauge flanges and exacerbate the leakage problem.

SUMMARY OF THE INVENTION

It is an object of the present invention to provide a motor terminal box which is substantially leak-proof. Another object is to provide a motor terminal box having a base and a removable cover with mating surfaces that are shaped and configured to prevent foreign matter from getting into the interior of the terminal box. Still another object is to provide a motor terminal box having a base and a removable cover with mating surfaces that are shaped and configured to strengthen the mating surfaces and the terminal box.

In general, a terminal box of the present invention comprises a base having a first perimeter flange, and a cover having a second perimeter flange adapted for engagement with the first perimeter flange. One of the first and second perimeter flanges has a projection and the other of the first and second perimeter flanges has a recess adapted to receive the projection when the first and second perimeter flanges are in engagement with one another.

Another aspect of a terminal box of the present invention comprises a base having a first perimeter flange, and a cover having a second perimeter flange adapted for engagement with the first perimeter flange. The first perimeter flange has a first mating surface lying substantially in a first plane. The second perimeter flange has a second mating surface lying substantially in a second plane. The first and second planes are substantially co-planer when the first and second perimeter flanges are in engagement with one another. One of the first and second perimeter flanges includes a projection and the other of the first and second perimeter flanges includes a recess adapted to receive the projection when the first and second perimeter flanges are in engagement with one another. At least a portion of the projection is spaced from the first and second planes when the first and second perimeter flanges are in engagement with one another.

Other objects and features will be in part apparent and in part pointed out hereinafter.

BRIEF DESCRIPTION OF THE DRAWINGS

FIG. 1 is a perspective view of a terminal box of the present invention mounted to a motor housing;

FIG. 2 is a side elevational view of the terminal box of FIG. 1;

FIG. 3 is a front and elevational view of the terminal box of FIG. 1;

FIG. 4 is a bottom plan view of the terminal box of FIG. 1;

FIG. 5 is a cross-sectional view taken along the plane of line 5—5 in FIG. 3;

Reference characters in the written specification indicate corresponding parts throughout the several views of the drawings.

DETAILED DESCRIPTION OF THE PREFERRED EMBODIMENTS

Figure 8:
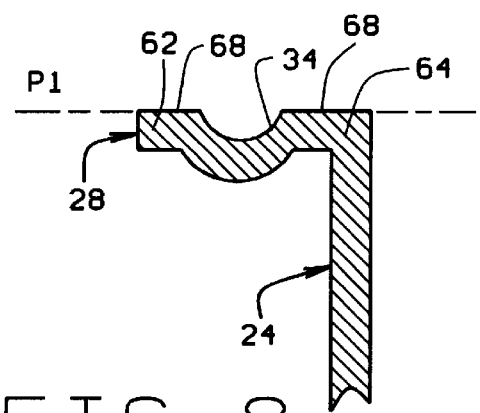
FIG. 8 is a cross-sectional view taken along the plane of line 8—8 in FIG. 6.
Figure 9:
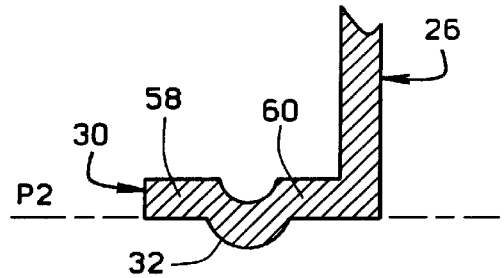
FIG. 9 is a cross-sectional view taken along the plane of line 9—9 in FIG. 7.

A motor terminal box of the present invention is represented in its entirety by the reference numerical 20. FIG. 1 shows the terminal box 20 mounted to a cylindrical shell 21 of a motor housing 22. Generally, the terminal box 20 comprises a base 24 and a removable cover 26. The base 24 includes a first perimeter flange 28, and the cover includes a second perimeter flange 30 adapted for engagement with the first perimeter flange 28 when the terminal box 20 is closed. As best shown in FIGS. 8 and 9, the second perimeter flange 30 includes a projection 32 and the first perimeter flange 28 includes a recess 34. As will be explained, the recess 34 is adapted to receive the projection 32 of the first perimeter flange 28 when the first and second perimeter flanges are in engagement with one another.

Figure 6:
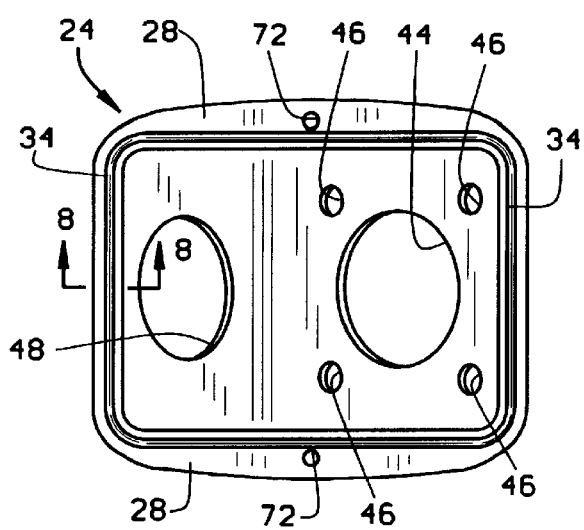
FIG. 6 is a plan view of a base of the terminal box of FIG. 1 looking into an interior of the base.

Preferably, the base 24 has a generally rectangular bottom 36, a generally rectangular front wall 38, and two generally triangular side walls 40 and 42. As shown in FIGS. 4 and 6, the bottom 36 has an aperture 44 extending therethrough so that lead wires (not shown) of the motor can pass into the terminal box 20. The base also includes four holes 46 to accommodate mechanical fasteners such as bolts (not shown) for fastening the base 24 to the motor housing 22. The front wall 38 has another aperture 48 extending therethrough so that feed wires (not shown) from a source of electricity can pass into the terminal box 20.

The cover 26 has a generally rectangular top wall 50, a generally rectangular rear wall 52, and two generally triangular side walls 54 and 56. The side walls 54 and 56 of the cover 26 and the side walls 40 and 42 of the base 24 together form generally rectangular side panels of the terminal box 20 when the first and second perimeter flanges 28 and 30 are in engagement with one another.

Preferably, the base 24 and cover 26 are constructed of metal or another durable material. As will be explained in greater detail hereinafter, the structure of the first and second perimeter flanges 28 and 30 is such that even a relatively thin gauge metal could be used without compromising the sealing engagement of the flanges.

In the preferred embodiment, projection 32 on the first perimeter flange 28 is a continuous "ridge" which extends without interruption substantially around the entire first perimeter flange 28. Also preferably, the recess 34 of the second perimeter flange 30 is a continuous "groove" which extends without interruption substantially around the entire second perimeter flange 30. In addition to providing an improved seal between the base 24 and the cover 26, the projection 32 (or "ridge") and the recess 34 (or "groove") serve as structural ribs which serve to strengthen the first and second perimeter flanges 28 and 30, respectively. The strengthening provided by the projection 32 and recess 34 permit thinner gauge metals to be used for the base 24 and 26 without compromising the durability of the terminal box 20.

It should be understood that, although the preferred embodiment is described as having a projection 32 in the form of a "ridge" and a recess 34 in the form of a "groove," other forms of projections and recesses could be used without departing from the scope of the invention as hereinafter claimed. It should also be understood that, although the preferred embodiment is described as having a projection 32 on the first perimeter flange 28 of the base 24 and a recess on the second perimeter flange 30 of the cover 26, the projection 32 could be on the second perimeter flange 30 and the recess 34 could be on the first perimeter flange 28 without departing from the scope of the present invention as claimed. Also, although the projection 32 is shown as having a generally curved convex configuration and the recess 34 is shown as having a generally curved concave configuration, other configuration shaped to mate with one another could be used.

Figure 10:
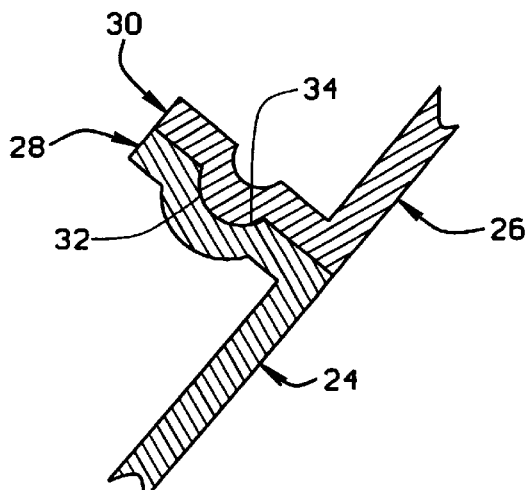
FIG. 10 is a detailed cross-sectional view taken along the plane of line 10—10 in FIG. 5.

The first perimeter flange 28 includes flat portions 58 and 60 on opposite sides of the projection 32. Similarly, the second perimeter flange 30 includes flat portions 62 and 64 on opposite sides of the recess 34. The flat portions 58 and 60 of the first perimeter flange 28 define a first mating surface 66 which lies substantially in a first plane P1. The flat portions 62 and 64 of the second perimeter flange 30 define a second mating surface 68 which lies substantially in a second plane P2. Preferably, planes P1 and P2 are substantially co-planar when the first and second perimeter flanges 28 and 30 are in engagement with one another. As shown in FIG. 10, at least a portion of the projection 32 is spaced from planes P1 and P2 when the first and second perimeter flanges 28 and 30 are in engagement with one another.

Figure 11:
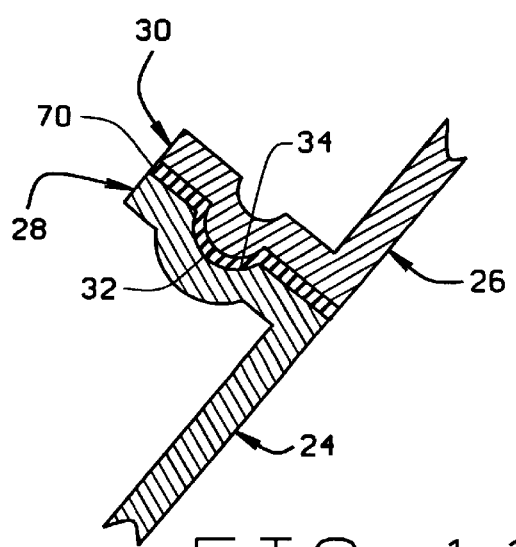
FIG. 11 is a detailed cross-sectional view similar to FIG. 10 showing a gasket disposed between the flanges.

As shown in FIG. 11, the preferred embodiment of the terminal box 20 further comprises a gasket 70 disposed between the first and second perimeter flanges 28 and 30. Preferably, the gasket 70 has a rectangular shape which generally matches the shapes of the first and second perimeter flanges 28 and 30. Preferably, the gasket 70 is formed from neoprene, but could be formed from other materials with similar qualities.

At least a portion of the gasket 70 is disposed between the projection 32 and the recess 34. As shown in FIG. 10, at least a portion of the gasket 70 adjacent the projection 32 is spaced from the planes P1 and P2 when the first and second perimeter flanges 28 and 30 are in engagement with one another. Therefore, when the first and second perimeter flanges 28 and 30 are in engagement with one another, the portion of the gasket 70 disposed between the projection 32 and the recess 34 is "squeezed" by the projection 32 and recess 34. This squeezing of the gasket 70 helps to prevent liquids from "wicking" into the terminal box 20 and improves the seal between the base 24 and the cover 26.

Figure 7:
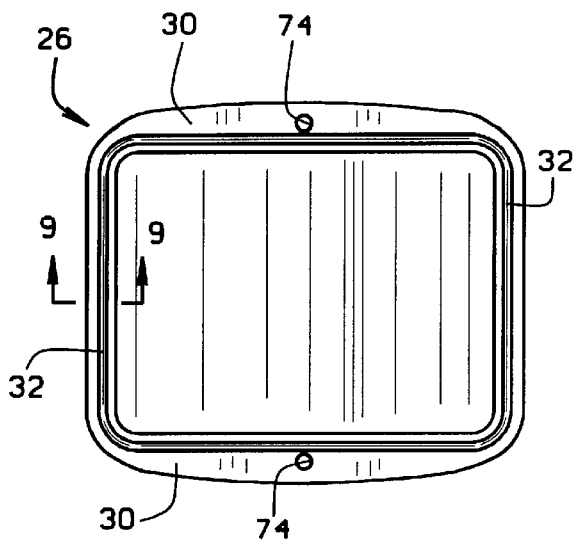
FIG. 7 is a plan view of a cover of the terminal box of FIG. 1 looking into an interior of the cover.

As shown in FIGS. 3, 4 and 6, the first perimeter flange 28 includes holes 72 and, as shown in FIG. 7, the second perimeter flange 30 includes corresponding holes 74. The holes 72 and 74 are sized to receive mechanical fasteners such as bolts (not shown) for fastening the cover 26 to the base 24.

In view of the above, it will be seen that the several objects of the invention are achieved and other advantageous results attained.

As various changes could be made without departing from the scope of the invention, it is intended that all matter contained in the above description or shown in the accompanying drawings shall be interpreted as illustrative and not in a limiting sense.

What is claimed is:

1. A terminal box for mounting on a housing of an electric motor, the terminal box comprising:

a base; and a cover adapted for engagement with the base;

one of the base and the cover having a first perimeter flange with an engagement side and a non-engagement side and the other of the base and the cover having a second perimeter flange with an engagement side and a non-engagement side, the first perimeter flange having a first deformation that defines a projection on its engagement side and a recess on its non-engagement side, the second perimeter flange having a second deformation that defines a recess on its engagement side and a projection on its non-engagement side, the recess of the second perimeter flange being adapted to receive the projection of the first perimeter flange when the base and the cover are in engagement with one another.

2. The terminal box of claim 1 wherein the projection of the first perimeter flange is a ridge and the recess of the second perimeter flange is a groove.

3. The terminal box of claim 2 wherein the ridge and the groove extend substantially around perimeters of their respective flanges.

4. The terminal box of claim 3 wherein the cover includes the first perimeter flange and the base includes the second perimeter flange.

5. The terminal box of claim 1 wherein the first deformation is shaped so that the projection on the engagement side of the first perimeter flange is generally convex and the recess on the non-engagement side of the first perimeter flange is generally concave.

6. The terminal box of claim 1 wherein the first and second flanges include flat portions on opposite sides of the first and second deformations.

7. The terminal box of claim 1 wherein the base includes a first aperture sized to receive lead wires from the motor and a second aperture sized to receive feed wires from a source of electricity.

8. The terminal box of claim 1 further comprising a gasket disposed between the first and second perimeter flanges.

9. The terminal box of claim 8 wherein at least a portion of the gasket is disposed between the projection and the recess.

10. The terminal box of claim 1 wherein the second deformation is shaped so that the recess on the engagement side of the second perimeter flange is generally concave and the projection on the non-engagement side of the second perimeter flange is generally convex.

11. The terminal box of claim 1 wherein the base has an interior volume and an opening thereto, and wherein the cover has an interior volume and an opening thereto, the first perimeter flange extending around the opening to the interior volume of the one of the base and the cover, the second perimeter flange extending around the opening to the interior volume of the other of the base and the cover.

12. A terminal box for mounting on a housing of an electric motor, the terminal box comprising:

a base; and a cover adapted for engagement with the base;

one of the base and the cover having a first perimeter flange with an engagement side and a non-engagement side and the other of the base and the cover having a second perimeter flange with an engagement side and a non-engagement side, the engagement side of the first perimeter flange lying substantially in a first plane, the engagement side of the second perimeter flange lying substantially in a second plane, the first perimeter flange having a first deformation that defines a projection on its engagement side and a recess on its non-engagement side, the second perimeter flange having a second deformation that defines a recess on its engagement side and a projection on its non-engagement side, the recess of the second perimeter flange being adapted to receive the projection of the first perimeter flange when the base and the cover are in engagement with one another, at least a portion of the projection on the engagement side of the first perimeter flange being spaced from the first and second planes when the base and the cover are in engagement with one another.

13. The terminal box of claim 12 wherein the projection on the engagement side of the first perimeter flange is a ridge and the recess on the engagement side of the second perimeter flange is a groove, the ridge and the groove each extending substantially continuously around a perimeter of their respective flange.

14. The terminal box of claim 13 further comprising a gasket disposed between the ridge and the groove so that at least a portion of the gasket adjacent the ridge and the groove is spaced from the first and second planes when the base and the cover are in engagement with one another.

15. The terminal box of claim 12 wherein the base has an interior volume and an opening thereto, and wherein the cover has an interior volume and an opening thereto, the first perimeter flange extending around the opening to the interior volume of the one of the base and the cover, the second perimeter flange extending around the opening to the interior volume of the other of the base and the cover.

16. A housing for an electric motor comprising:

a cylindrical shell; and a terminal box adapted for mounting on an exterior surface of the cylindrical shell, the terminal box comprising:

a base; and a cover adapted for engagement with the base;

one of the base and the cover having a first perimeter flange with an engagement side and a non-engagement side and the other of the base and the cover having a second perimeter flange with an engagement side and a non-engagement side, the first perimeter flange having a first deformation that defines a projection on its engagement side and a recess on its non-engagement side, the second perimeter flange having a second deformation that defines a recess on its engagement side and a projection on its non-engagement side, the recess of the second perimeter flange being adapted to receive the projection of the first perimeter flange when the base and the cover are in engagement with one another.

17. The housing of claim 16 wherein the first and second flanges include flat portions on opposite sides of the first and second deformations.

18. The housing of claim 16 wherein the base has an interior volume and an opening thereto, and wherein the cover has an interior volume and an opening thereto, the first perimeter flange extending around the opening to the interior volume of the one of the base and the cover, the second perimeter flange extending around the opening to the interior volume of the other of the base and the cover.

19. The housing of claim 16 wherein the projection of the first perimeter flange is a ridge and the recess of the second perimeter flange is a groove.

20. The housing of claim 19 wherein the ridge is a continuous ridge and the groove is a continuous groove, the ridge and the groove continuing without interruption substantially around entire perimeters of their respective flanges.

21. The housing of claim 20 wherein the cover includes the first perimeter flange and the base includes the second perimeter flange.

22. The housing of claim 19 further comprising a gasket disposed between at least a portion of each of the first and second perimeter flanges.

23. The housing of claim 22 wherein at least a portion of the gasket is disposed between at least a portion of each of the projection of the first perimeter flange and the recess of the second perimeter flange.

* * * * *